United States Patent
Yoshida (10) Patent No.: US 8,123,178 B2
(45) Date of Patent: Feb. 28, 2012

(54) FIXING STRUCTURE OF WIRE HARNESS

(75) Inventor: Koji Yoshida, Nagoya (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 59 days.

(21) Appl. No.: 12/598,797

(22) PCT Filed: Apr. 25, 2008

(86) PCT No.: PCT/JP2008/058061
§ 371 (c)(1),
(2), (4) Date: Nov. 4, 2009

(87) PCT Pub. No.: WO2008/142953
PCT Pub. Date: Nov. 27, 2008

(65) Prior Publication Data
US 2010/0148014 A1  Jun. 17, 2010

(30) Foreign Application Priority Data
May 18, 2007 (JP) .................................. 2007-133241

(51) Int. Cl.
*F16L 3/00* (2006.01)
(52) U.S. Cl. ......... 248/49; 248/634; 248/74.2; 248/503; 296/146.7; 174/72 A; 361/827; 24/129 B
(58) Field of Classification Search .................. 248/634, 248/55, 74.2, 503, 74.1, 49; 174/110 D, 174/72 A; 361/827; 24/129 B, 481, 267, 24/910; 296/146.7, 39.1, 39.3
See application file for complete search history.

(56) References Cited

U.S. PATENT DOCUMENTS

| 3,861,015 | A | * | 1/1975 | Hooven | 29/755 |
| 4,219,174 | A | * | 8/1980 | Whitehouse | 248/71 |
| 5,911,468 | A | * | 6/1999 | Le Du | 296/208 |
| 7,284,730 | B2 | * | 10/2007 | Walsh et al. | 248/74.3 |
| 7,724,506 | B2 | * | 5/2010 | Wu et al. | 361/679.01 |

FOREIGN PATENT DOCUMENTS

| JP | 9-48295 | 2/1997 |
| JP | 2002-25721 | 1/2002 |
| JP | 2003-48494 | 2/2003 |
| JP | 2006-76531 | 3/2006 |

OTHER PUBLICATIONS

English language Abstract of JP 2006-76531, Mar. 23, 2006.
English language Abstract of JP 2003-48494, Feb. 18, 2003.
English language Abstract of JP 2002-25721, Jan. 25, 2002.
English language Abstract of JP 9-48295, Feb. 18, 1997.

* cited by examiner

*Primary Examiner* — Terrell McKinnon
*Assistant Examiner* — Bradley Duckworth
(74) *Attorney, Agent, or Firm* — Greenblum & Bernstein, P.L.C.

(57) ABSTRACT

The present invention provides a hard-to-fall fixing structure of wire harness contributive to cost reduction in which VOC is not generated and flapping sound (noise) of wire harness is hard to occur. In the fixing structure of a wire harness to a vehicle interior material according to the present invention, a silencer pad (acoustical material) is fixed to the vehicle interior material, and the silencer pad is provided with a latching piece formed by cutting a portion of the present silencer pad, and the wire harness is latched to the latching piece.

5 Claims, 10 Drawing Sheets

FIXING STRUCTURE OF WIRE HARNESS

TECHNICAL FIELD

The present invention relates to a fixing structure of wire harness.

BACKGROUND ART

Conventionally, as a fixing structure of wire harness to a vehicle interior material, fixing by means of an adhesive tape or a clip as disclosed in Patent literature 1 has been well-known. Patent literature 1 has been disclosing that a clip capable of elastic deformation which elastically latches wire harness is arranged in multiple positions to where the wire harness extends in a vehicle door trim as a vehicle interior material.
[Patent literature 1]: Japanese Unexamined Patent Publication No. H09-48295

Problem to be Solved by the Invention

According to the above-mentioned conventional fixing structure of wire harness by means of an adhesive tape or a clip, there have been problems as follows.
(1) In the case of fixing by a tape, it is likely that separation due to aging degradation of the adhesion occurs, and thereby causing the wire harness to fall.
(2) In the case of using an adhesive, VOC (volatile organic compound) is likely to be generated.
(3) In the case of fixing by a clip, a large number of fixed parts are needed for suppressing the flapping sound of the wire harness caused by vibration, causing the fixing operation to be bothersome, and possibly leading to a cost increase.
(4) In any methods, many workings are required for suppressing the flapping sound (noise) of the wire harness, and thereby causing a large workload.

DISCLOSURE OF THE INVENTION

The present invention has been completed based on the above problems, and its purpose is to provide a hard-to-fall fixing structure of wire harness contributive to cost reduction in which VOC is not generated and flapping sound (noise) of wire harness is hard to occur.

Means for Solving the Problem

To solve the above problems, the fixing structure of wire harness according to the present invention is for fixing the wire harness to a vehicle interior material, wherein an acoustical material is fixed to the interior material for vehicle, the acoustical material is provided with a latching piece formed by cutting a portion of the acoustical material, and the wire harness is latched to the latching piece.

Such fixing structure conducts fixing by the latching piece formed by cutting the acoustical material, being contributive to cost reduction since not using tapes or clips, and thus can prevent generation of VOC since not needing an adhesive. In addition, aging of the fixing force is hard to occur, making the wire harness hard-to-fall. Moreover, the latching piece is formed by cutting the acoustical material and can therefore be formed in any positions. For example, multiple latching pieces can be arranged in a row along the path of the wire harness, so as to prevent flapping of the wire harness caused by vibration, and thereby preventing or suppressing the generation of flapping sound (noise). Additionally, the cutting operation is simple in comparison with the attaching operation using tapes and clips, and the workload can therefore be reduced.

In the fixing structure according to the present invention, the latching piece comprises a pair of protruding pieces and a section between protruding pieces positioned between the pair of protruding pieces, and the wire harness is held and latched between the protruding piece and the section between protruding pieces, so that the protruding piece prevents the vehicle interior material or the body disposed inside of the vehicle interior material from coming into contact with the wire harness.

As mentioned, when latching the wire harness between the pair of protruding pieces and the section between protruding pieces in a manner so as to hold the same, the wire harness can be surely latched by the pair of protruding pieces, and moreover, the wire harness can be prevented from coming into contact with the vehicle interior material or a vehicle body disposed inside of the vehicle interior material.

In the fixing structure according to the present invention, the latching piece may comprise a semi-annular cut part and two piece-shaped cut parts formed in a shape so as to extend mutually from both ends of the semi-annular cut part to the closing shape side of the semi-annular cut part.

In this case, the two piece-shaped cut parts constitute the pair of protruding pieces, and the wire harness can be inserted into the cut open part between the protruding piece and the section between protruding pieces so as be latched by the latching piece without falling off, and moreover, can be prevented from coming into contact with, for example, the vehicle body disposed in one side of the vehicle interior material.

In addition, the vehicle interior material may be a package tray, and the wire harness may be a power transmission line for supplying electric power to electrical components mounted in the package tray.

The power transmission line for electrical components mounted in the package tray is preferred to be latched in the back surface side of the package tray as a vehicle interior material, however, according to the present invention, the latching piece is provided in the acoustical material fixed to the back surface of the package tray so as to latch the wire harness thereto, and the wire harness can therefore be prevented from falling off the package tray, while the flapping of the wire harness is prevented, and thus, the generation of flapping sound (noise) of the wire harness can be prevented.

According to the present invention, there can be provided a hard-to-fall fixing structure of wire harness contributive to cost reduction in which VOC is not generated and flapping sound (noise) of wire harness is hard to occur.

DESCRIPTION OF SYMBOLS

10 . . . package tray (vehicle interior material), 20 . . . silencer pad (acoustical material), 21 . . . latching piece, 22, 23 . . . protruding piece, 24 . . . section between protruding pieces, 30 . . . wire harness, 35 . . . high mount stop lamp

BEST MODE FOR CARRYING OUT THE INVENTION

Figure 1:
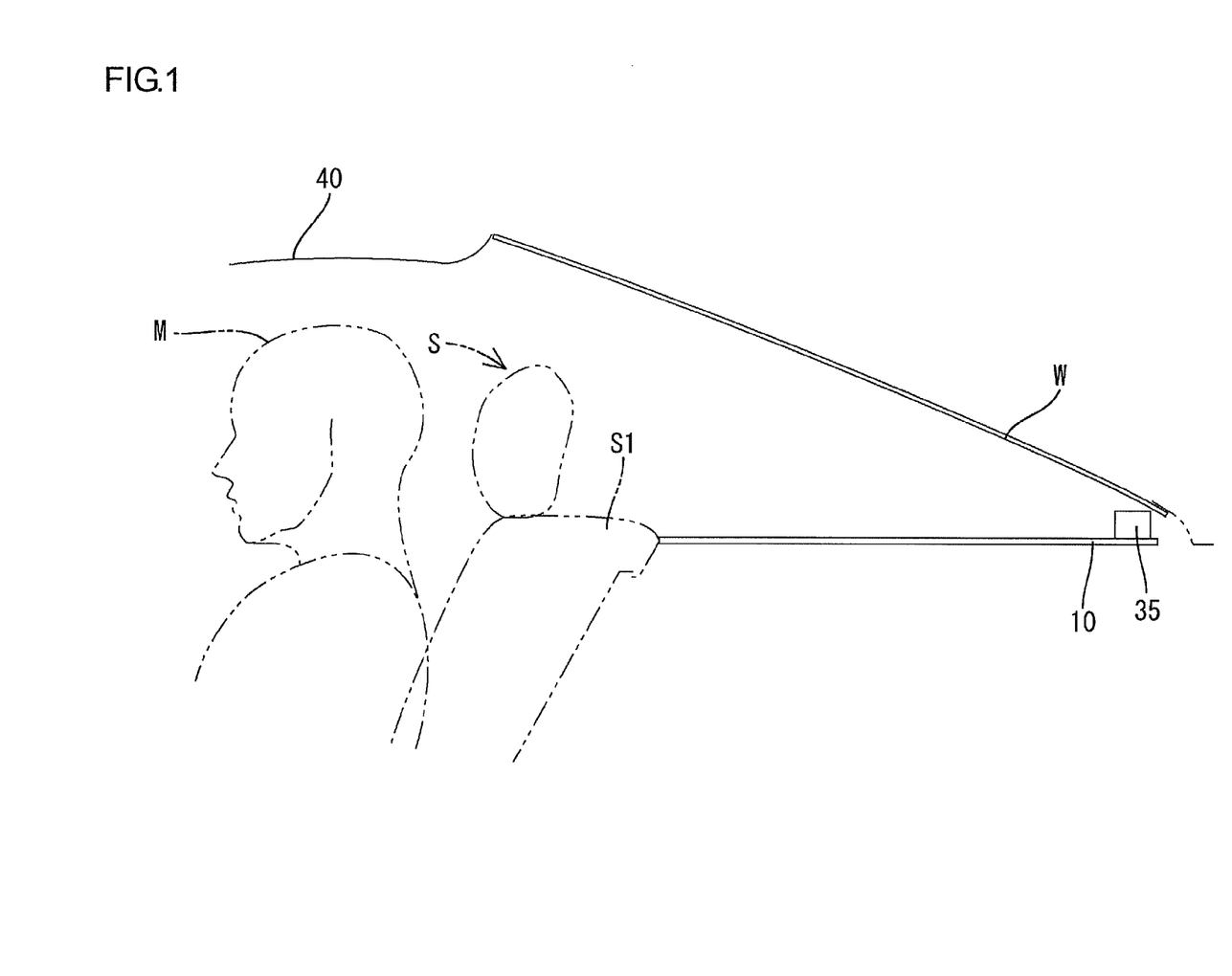
FIG. 1 is an explanatory view showing a schematic configuration of the rear part side surface of a vehicle.
Figure 2:
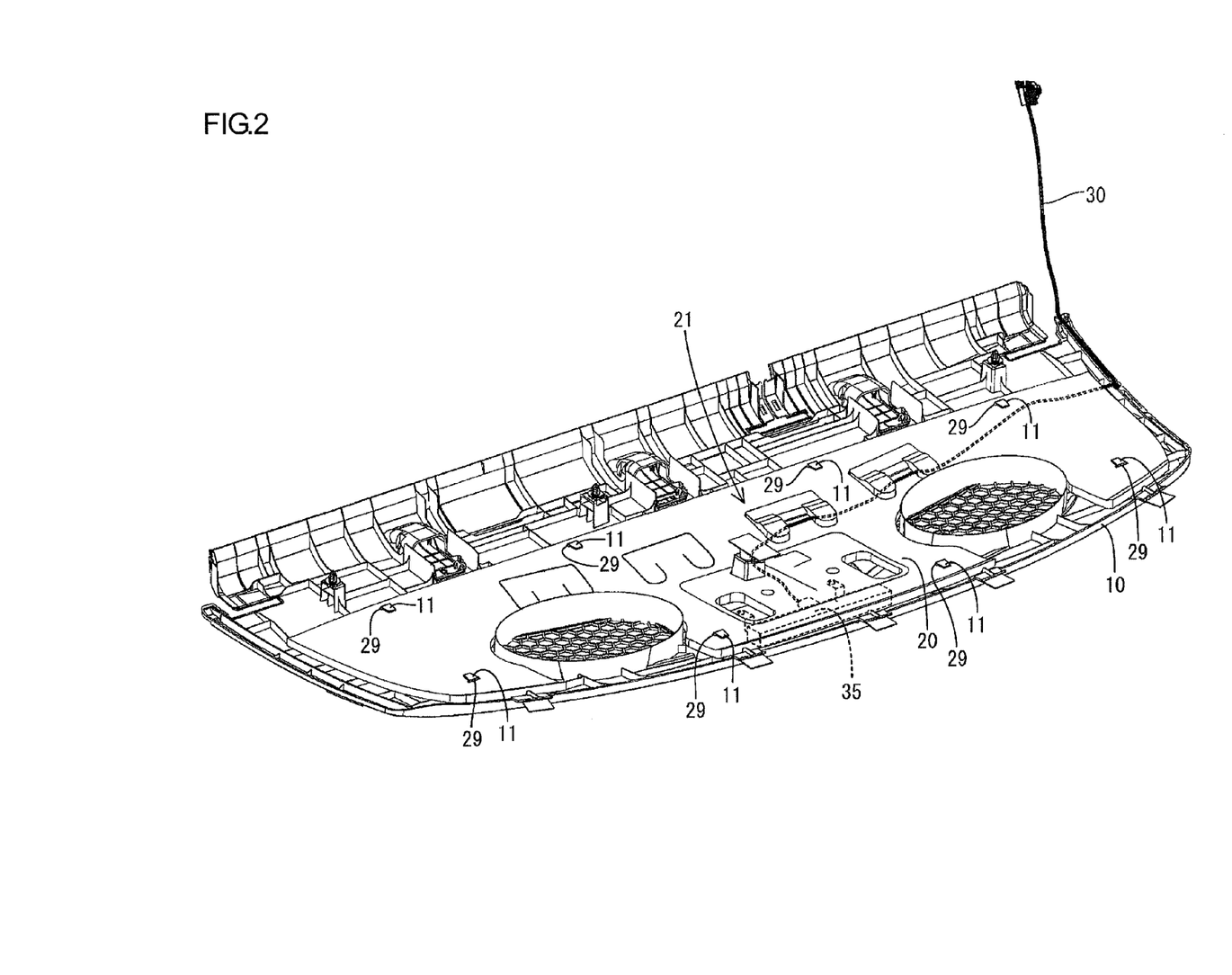
FIG. 2 is a perspective view showing the back surface configuration of a vehicle interior material (package tray) including a fixing structure of wire harness according to the present invention.
Figure 3:
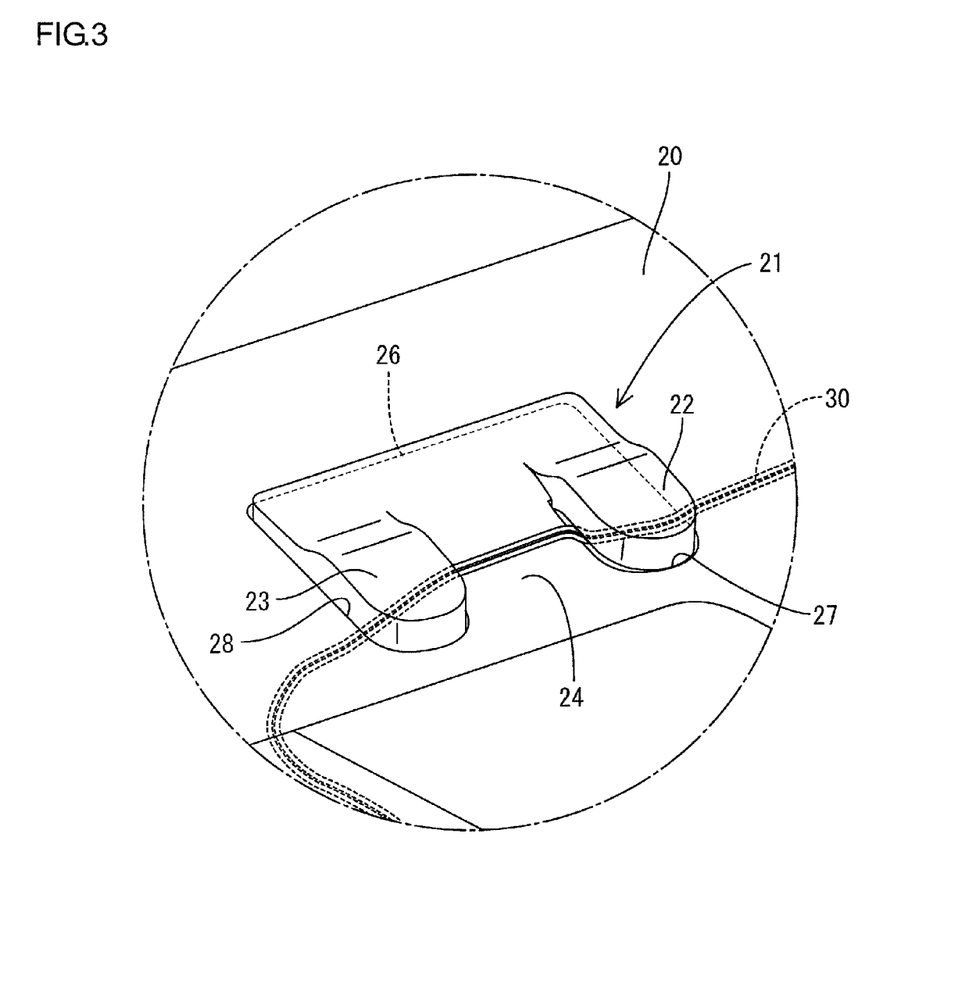
FIG. 3 is an explanatory view showing the expanded fixing structure of wire harness.
Figure 4:
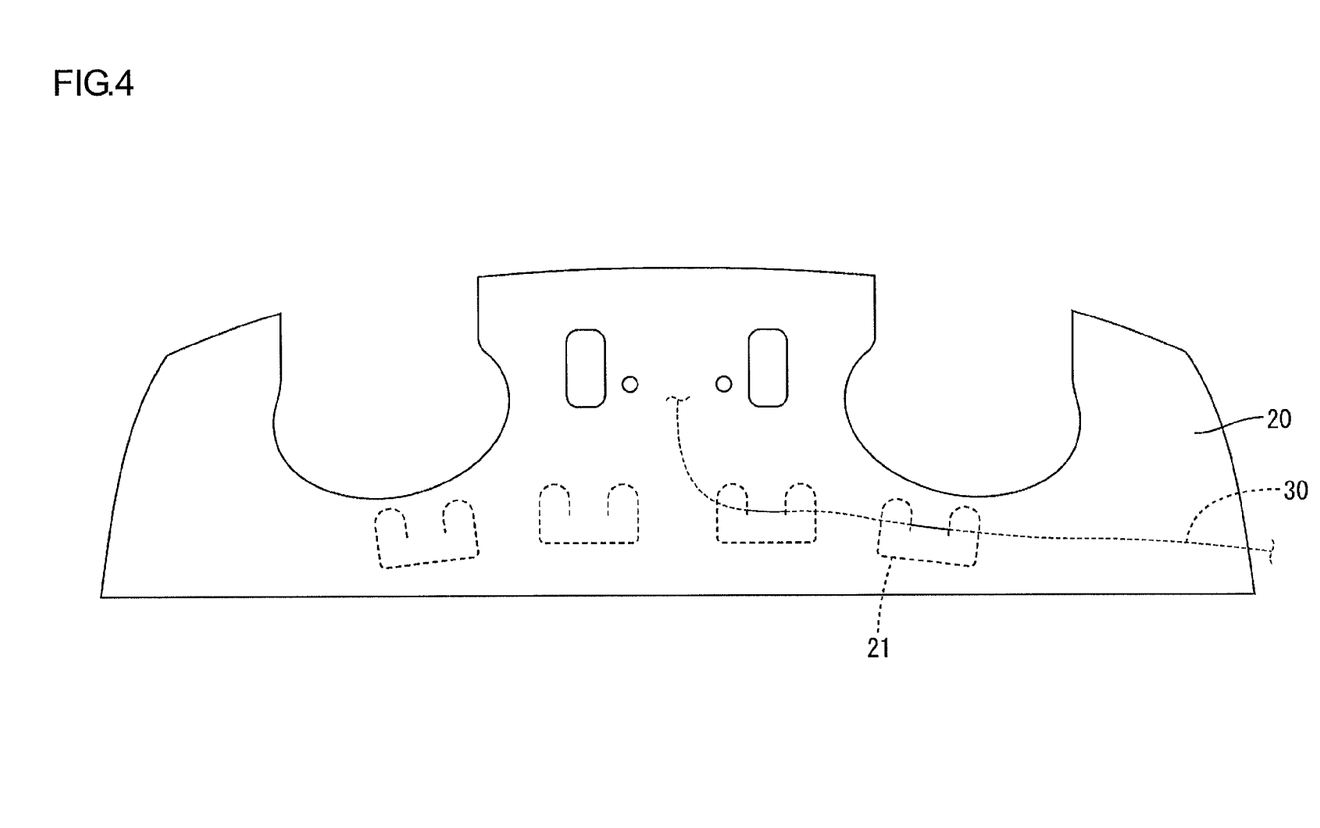
FIG. 4 is a plane view showing arrangement positions of latching pieces.

In what follows, as referring to the drawings, a fixing structure of wire harness according to the present invention is described. FIG. 1 is an explanatory view showing a schematic configuration of the rear part side surface of a vehicle; FIG. 2 is a perspective view showing the back surface configuration of a vehicle interior material (package tray) including the fixing structure of wire harness according to the present invention; FIG. 3 is an explanatory view showing the expanded fixing structure of wire harness; and FIG. 4 is a plane view showing arrangement positions of latching pieces the fixing structure of wire harness comprises.

In FIG. 1, arranged in the upper rear part of a sheet back S1 of a rear sheet S, in which a passenger M can be seated, is a package tray 10 as an interior material, and arranged in the package tray 10 is a high mount stop lamp 35 as an electrical component. On the other hand, in the lower part (inner part) of the package tray 10, as shown in FIG. 2, a silencer pad 20 functioning as, for example, an acoustical material (a sound insulator or an acoustic absorbent) is attached. In addition, in FIG. 1, a symbol W represents a rear window, while a symbol 40 represents a vehicle roof panel.

The package tray 10 is made of a thermoplastic resin molded into a prescribed shape, or attached or integrally molded with a skin material according to needs. The silencer pad 20 is made of a plate-like felt material molded into a prescribed shape, and mounted in the package tray 10. The high mount stop lamp 35 is a brake lamp, lighting up according to the driver's operation of the brake pedal.

The silencer pad 20 is assembled to the package tray 10 through, for example, a rib 11. In other words, the piece-shaped rib 11 formed in the package tray 10 is inserted into to a slit (cut) 29 formed in the silencer pad 20 as opposing the rib 11, and the present rib 11 is folded so as to abut the silencer pad 20, and then, the rib 11, the silencer pad 20, and the package tray 10 are welded together at a welding part 21 in a manner that the folded rib 11 and the package tray 10 hold the silencer pad 20 therebetween. The welding here may be conducted by, for example, ultrasonic vibration.

In addition, the silencer pad 20 may be assembled to the package tray 10 in a way other than the above manner of holding by a rib using ultrasonic vibration, and for example a latching part such as a claw provided in the package tray 10 may be inserted into the slit 29 in the silencer pad 20 for latching.

A wire harness 30 is fixed to the silencer pad 20 which has been fixed to the package tray 10 in the above manner. The wire harness 30 is a power transmission line (signal line) for the high mount stop lamp 35, and conducts the power supply from a battery (not shown) to the high mount stop lamp 35 as well as the command signal supply from a lighting controller (not shown) to the high mount stop lamp 35.

Here, the wire harness 30 is fixed to the silencer pad 20 by a latching piece 21 formed in the silencer pad 20. The latching piece 21 is formed by cutting a portion of the silencer pad 20 into a nearly U-shape as shown in FIG. 3 (a semi-annular cut part 26), and moreover, by cutting two symmetrical circular arcs (piece-shaped cut parts 27 and 28) in a shape so as to oppose each other in the circle closing side from the both ends of the semi-annular cut part 26 cut into U-shape. As a result, the latching piece 21 is composed of a pair of protruding pieces 22 and 23, so that the pair of protruding pieces 22 and 23 together with a section between protruding pieces 24 formed in between the protruding pieces 22 and 23 fix the wire harness 30 by holding the same therebetween.

More particularly, as shown in FIG. 2, the wire harness 30 guided in from the side end of the package tray 10 passes a space between the package tray 10 and the silencer pad 20, and then guided toward the center. Then, in the first latching piece 21, the wire harness 30 is, as shown in FIG. 3, guided onto the front surface side of the silencer pad 20 as lifting up the first protruding piece 22, and then hang over the section between protruding pieces 24, and then is guided to the back surface side of the silencer pad 20 as lifting up the second protruding piece 23. After all, the wire harness 30 is held by the cut part between the first protruding piece 22 and the section between protruding pieces 24 and between the section between protruding pieces 24 and the second protruding piece 23.

Furthermore, also in the second latching piece 21, the wire harness 30 is, as shown in FIG. 3, guided onto the front surface side of the silencer pad 20 as lifting up the first protruding piece 22, and then hang over the section between protruding pieces 24, and then is guided to the back surface side of the silencer pad 20 as lifting up the second protruding piece 23. After all, the wire harness 30 is held by the cut part between the first protruding piece 22 and the section between protruding pieces 24 and between the section between protruding pieces 24 and the second protruding piece 23.

With such fixing by the latching pieces 21, the wire harness 30 is surely fixed to the silencer pad 20 and moreover to the package tray 10, so that the high mount stop lamp 35 can be surely supplied with electric power along the fixing path. Particularly, the protruding pieces 22 and 23 and the section between protruding pieces 24 hold and fix the wire harness 30, and it is therefore hard for the wire harness 30 to flap and be displaced.

In the present embodiment, as shown in FIG. 4, the latching pieces 21 are aligned in four places in the silencer pad 20. With two latching pieces 21 for one group, two groups of the same are arranged in a symmetrical manner with the center of the silencer pad 20 as a border. In FIG. 4, the upper part is the vehicle's left side, while the right side is the vehicle's front side. Here, one group of the latching pieces 21 is arranged in a row along the path of the wire harness 30 extending from the vehicle's left side, fixing the present wire harness 30.

In the present embodiment employing such fixing structure of the wire harness 30, work and effect as in the following can be developed. Firstly, in the fixing structure according to the present embodiment, the latching piece 21 formed by cutting the silencer pad 20 fixes the wire harness 30, and thus, the number of parts can be reduced in comparison with fixing by means of tapes or clips. And also, no particular adhesive is needed, and thereby contributing to the prevention of generation of VOC (volatile organic compound). In addition, aging of the fixing force, as seen in tapes, is hard to occur, making the wire harness 30 hard-to-fall.

Additionally, the latching piece 21 is formed by cutting the silencer pad 30, and thus can be formed in any positions. As in the present embodiment, multiple latching pieces can be easily arranged in a row along the path of the wire harness 30, so as to prevent flapping of the wire harness 30 caused by vibration, and thereby preventing or suppressing the generation of flapping sound (noise). Additionally, such cutting operation is more simple in comparison with the attaching operation using tapes and clips, and the workload can therefore be reduced.

Furthermore, the latching piece 21 is formed by cutting two symmetrical circular arcs opposing from the both ends of the U-shape, so that two circular-arc-shaped latching pieces are formed (protruding pieces 22 and 23). The wire harness 30 is latched by the present two circular-arc-shaped latching pieces (protruding pieces 22 and 23), so as not to fall off the latching piece 21, and thereby making the fixing structure more certain. Consequently, the wire harness 30 is prevented from coming into contact with, for example, the vehicle body (not shown) disposed inside of the package tray 10, and thus the noise generation caused by such contact can be prevented.

With embodiments of the present invention described above with reference to the accompanying drawings, it is to be understood that the invention is not limited to those precise embodiments, and the embodiments as below can be within the scope of the present invention.

(1) The package tray 10 was exemplified as a vehicle interior material, however, the fixing structure of wire harness according to the present invention may be applied in a case of assembling a silencer pad to a door trim as an interior material or a ceiling interior material.

(2) As an electrical component in the present invention, the high mount stop lamp was applied, however, a speaker, a detective sensor, an air conditioner, and a lighting device such as an illumination may also be applied.

(3) In the above embodiment, as the latching piece 21, the semi-annular cut part 26 is formed by cutting a portion of the silencer pad 20 into a nearly U-shape, and furthermore, two symmetrical circular arc shapes (the piece-shaped cut parts 27 and 28) are cut in a shape so as to oppose each other from both ends of the semi-annular cut part 26. However, any structure comprising at least the semi-annular cut part 26 and two piece-shaped cut parts 27 and 28 extending from both ends of the semi-annular cut part 26 toward the closing shape side of the semi-annular cut part 26 may be applied.

Figure 5:
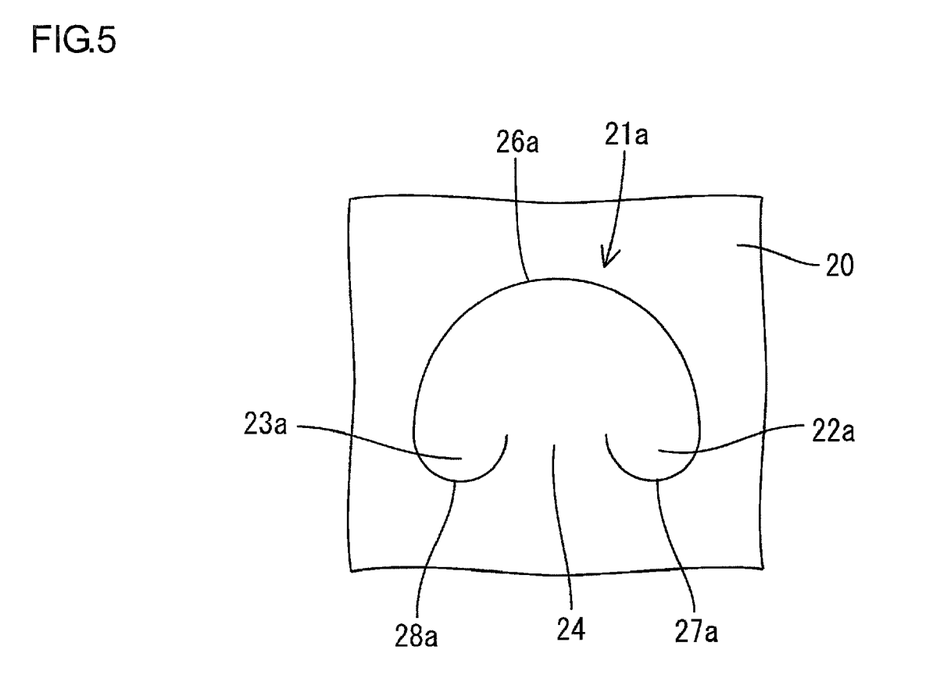
FIG. 5 is a plane view showing one deformation example of a cutting shape constituting the latching piece.

(4) For example, in a latching piece 21a shown in FIG. 5, piece-shaped cut parts 27a and 28a in a circular arc shape are formed in a shape so as to extend mutually from the both ends of a semi-annular cut part 26a in a nearly circular arc shape to the closing shape side of the semi-annular cut part 26a, and thereby constituting a pair of protruding pieces 22a and 23a.

Figure 6:
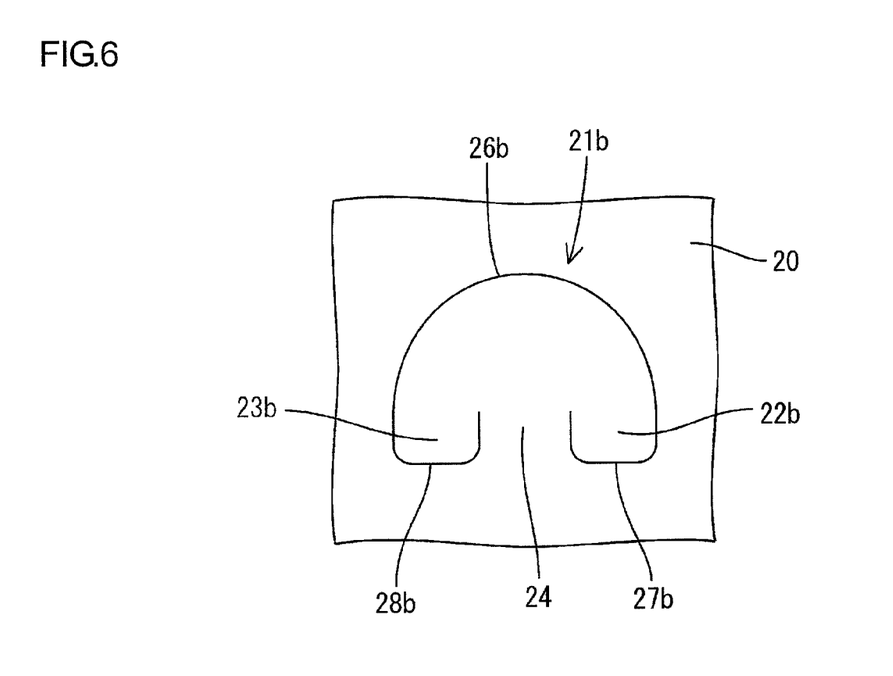
FIG. 6 is a plane view showing one deformation example of a cutting shape constituting the latching piece.

(5) In a latching piece 21b shown in FIG. 6, piece-shaped cut parts 27b and 28b in a hook shape are formed in a shape so as to extend mutually from the both ends of a semi-annular cut part 26b in a nearly circular arc shape to the closing shape side of the semi-annular cut part 26b, and thereby constituting a pair of protruding pieces 22b and 23b.

Figure 7:
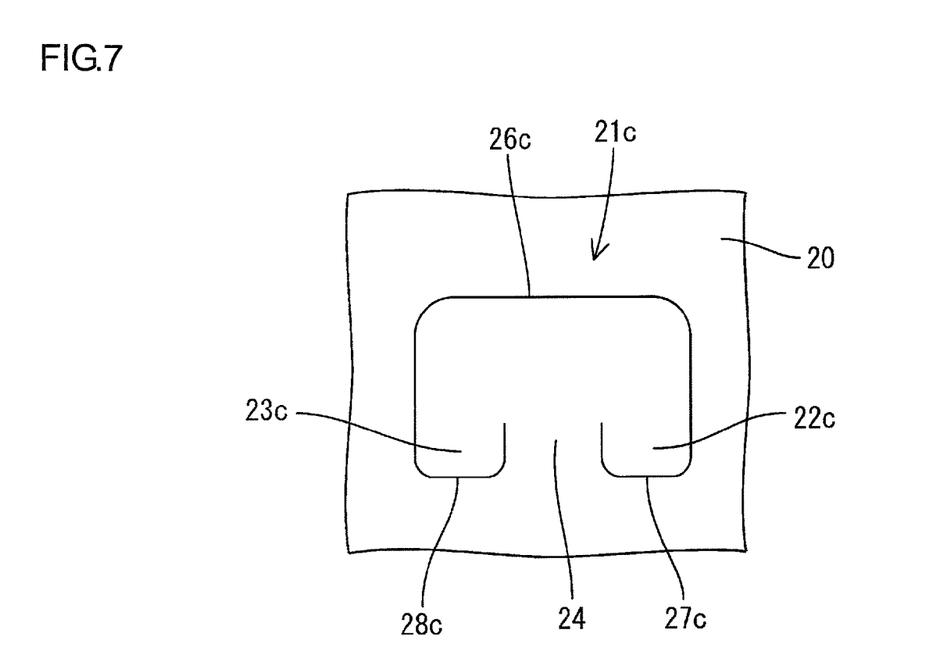
FIG. 7 is a plane view showing one deformation example of a cutting shape constituting the latching piece.

(6) In a latching piece 21c shown in FIG. 7, piece-shaped cut parts 27c and 28c in a hook shape are formed in a shape so as to extend mutually from the both ends of a semi-annular cut part 26c in a nearly U-shape to the closing shape side of the semi-annular cut part 26c, and thereby constituting a pair of protruding pieces 22c and 23c.

Figure 8:
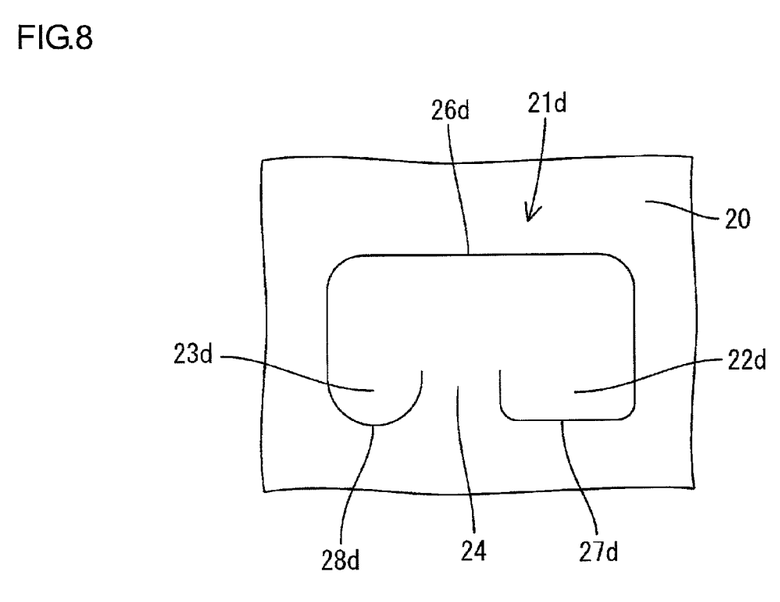
FIG. 8 is a plane view showing one deformation example of a cutting shape constituting the latching piece.

(7) In a latching piece 21d shown in FIG. 8, piece-shaped cut parts 27d and 28d in a hook shape are formed in an unsymmetrical manner so as to extend mutually from the both ends of a semi-annular cut part 26d in a nearly U-shape to the closing shape side of the semi-annular cut part 26d, and thereby constituting a pair of protruding pieces 22d and 23d.

Figure 9:
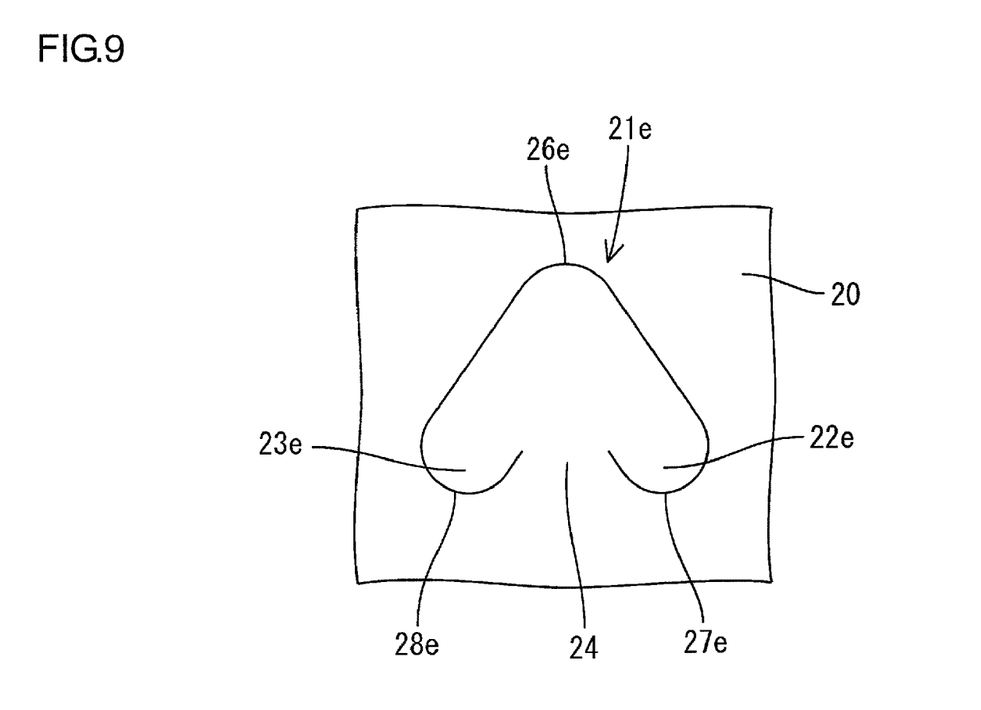
FIG. 9 is a plane view showing one deformation example of a cutting shape constituting the latching piece.

(8) In a latching piece 21e shown in FIG. 9, piece-shaped cut parts 27e and 28e in a circular arc shape are formed in a shape so as to extend mutually from the both ends of a semi-annular cut part 26e in a nearly triangle shape to the closing shape side of the semi-annular cut part 26e, and thereby constituting a pair of protruding pieces 22e and 23e.

Figure 10:
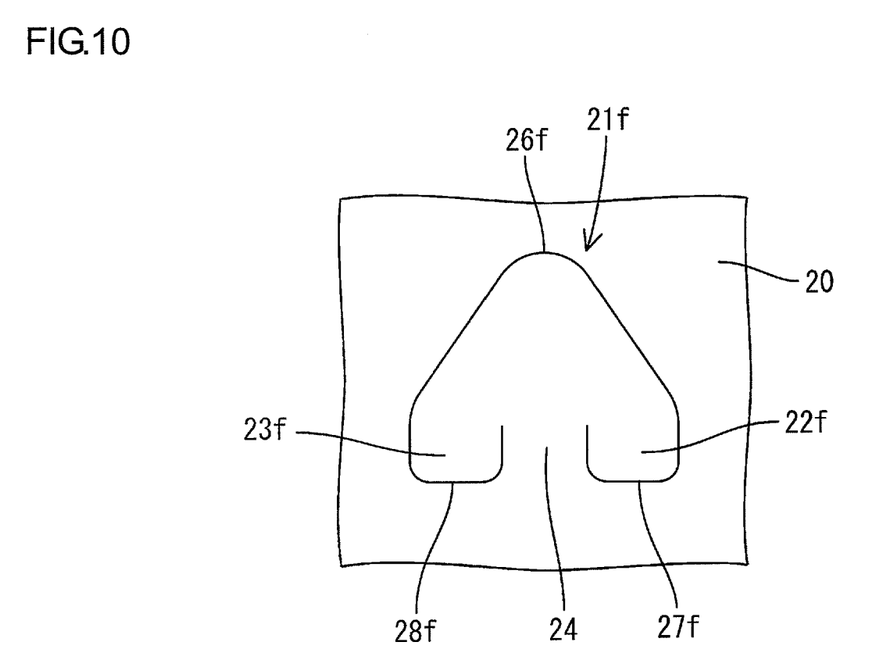
FIG. 10 is a plane view showing one deformation example of a cutting shape constituting the latching piece.

(9) In a latching piece 21f shown in FIG. 10, piece-shaped cut parts 27f and 28f in a hook shape are formed in a shape so as to extend mutually from the both ends of a semi-annular cut part 26f in a nearly triangle shape to the closing shape side of the semi-annular cut part 26f, and thereby constituting a pair of protruding pieces 22f and 23f.

The invention claimed is:

1. A fixing structure for fixing a wire harness to a vehicle interior member, comprising:
    an acoustical member made of a felt sheet and fixed to the vehicle interior member; and
    a latching piece comprising a stem and a flap formed by cutting a part of the acoustical member and having a pair of fingers, the stem continuing from another part of the acoustical member and being located between the fingers, each finger being formed in a shape so as to hold the wire harness in place without being in contact with the vehicle interior member.

2. The fixing structure according to claim 1, wherein the latching piece comprises a semi-annular cut part and two piece-shaped cut parts formed in a shape so as to extend mutually from both ends of the semi-annular cut part.

3. The fixing structure according to claim 1, wherein the vehicle interior member is a package tray, and the wire harness is a power transmission line for supplying electric power to an electrical component mounted in the package tray.

4. The fixing structure according to claim 2, wherein the vehicle interior member is a package tray, and the wire harness is a power transmission line for supplying electric power to an electrical component mounted in the package tray.

5. The fixing structure according to claim 1, wherein each finger has a free end to be lifted so that the wire harness slides in under the finger.

* * * * *